United States Patent
Gryzlov et al.

(10) Patent No.: US 12,254,252 B2
(45) Date of Patent: Mar. 18, 2025

(54) METHOD AND SYSTEM FOR MULTIPHASE FLOW METER USING UPDATED FLOW MODEL BASED ON SIMULATED DATA

(71) Applicant: SAUDI ARABIAN OIL COMPANY, Dhahran (SA)

(72) Inventors: Anton Gryzlov, Moscow (RU); Sergey Safonov, Moscow (RU); Muqbil Alkhalaf, Dhahran (SA); Muhammad Arsalan, Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 932 days.

(21) Appl. No.: 17/363,188

(22) Filed: Jun. 30, 2021

(65) Prior Publication Data
US 2023/0004697 A1    Jan. 5, 2023

(51) Int. Cl.
*G06F 30/28* (2020.01)
*E21B 47/10* (2012.01)
(Continued)

(52) U.S. Cl.
CPC ............... *G06F 30/28* (2020.01); *E21B 47/10* (2013.01); *G06F 30/27* (2020.01); *G06N 3/02* (2013.01);
(Continued)

(58) Field of Classification Search
CPC ...... G06F 30/28; G06F 30/27; G06F 2113/08; E21B 47/10; E21B 2200/20; E21B 2200/22; G06N 3/02; G06N 3/0464; G01F 1/74
(Continued)

(56) References Cited

U.S. PATENT DOCUMENTS

| | | | |
|---|---|---|---|
| 4,683,759 A | 8/1987 | Skarsvaag et al. | |
| 7,562,584 B2 * | 7/2009 | Conquergood | G01F 15/14 |
| | | | 73/861.26 |

(Continued)

FOREIGN PATENT DOCUMENTS

| | | |
|---|---|---|
| CN | 104089985 B | 8/2016 |
| CN | 110108331 A | 8/2019 |

(Continued)

OTHER PUBLICATIONS

Colin Lea et al., "Temporal convolutional networks: A unified approach to action segmentation", 2016, Computer Vision—ECCV 2016 Workshops: Amsterdam, The Netherlands, Proceedings, Part III, 4 pages.*

(Continued)

*Primary Examiner* — Juan C Ochoa
(74) *Attorney, Agent, or Firm* — Osha Bergman Watanabe & Burton LLP

(57) ABSTRACT

A method may include obtaining, from various sensors, acquired sensor data regarding various multiphase flows in a multiphase flow meter that are sampled at a predetermined sampling frequency. The acquired sensor data may describe various transient signals that correspond to various gas droplets. The method may further include generating, based on the acquired sensor data, a flow model for the multiphase flow meter. The method may further include updating the flow model to produce a first updated flow model using simulated flow data. The method may further include updating the first updated flow model to produce a second updated flow model using simulated sensor data. The second updated flow model may be used to determine one or more flow rates within a multiphase flow.

18 Claims, 9 Drawing Sheets

(51) Int. Cl.
*G06F 30/27* (2020.01)
*G06F 113/08* (2020.01)
*G06N 3/02* (2006.01)

(52) U.S. Cl.
CPC ....... *E21B 2200/20* (2020.05); *E21B 2200/22* (2020.05); *G06F 2113/08* (2020.01)

(58) Field of Classification Search
USPC .................................................. 703/10, 2, 6
See application file for complete search history.

(56) References Cited

U.S. PATENT DOCUMENTS

| | | | |
|---|---|---|---|
| 7,624,652 B2 * | 12/2009 | Wee ........................... | G01F 1/88 73/861.63 |
| 9,863,798 B2 * | 1/2018 | Henry ................... | G01F 1/8436 |
| 9,927,270 B2 | 3/2018 | Xie | |
| 2016/0290841 A1 | 10/2016 | Cadalen et al. | |
| 2019/0277680 A1 | 9/2019 | Baumoel | |
| 2020/0003599 A1 | 1/2020 | Theuveny et al. | |
| 2020/0033174 A1 | 1/2020 | Nogueira et al. | |
| 2020/0408573 A1 | 12/2020 | Chand et al. | |
| 2021/0010843 A1 | 1/2021 | Henry et al. | |

FOREIGN PATENT DOCUMENTS

| | | | | |
|---|---|---|---|---|
| WO | WO2016003985 | * | 6/2014 | ............... G01F 1/74 |
| WO | 2016003985 A1 | | 1/2016 | |
| WO | WO2020018822 | * | 1/2019 | ............... G01F 1/74 |
| WO | 2020018822 A1 | | 1/2020 | |

OTHER PUBLICATIONS

Wee, Arnstein, et al., "Tomography powered multiphase and wetgas meter providing measurements used for fiscal metering", North Sea Flow Measurement Workshop, Oct. 16-19, 2007 (24 pages).

Johansen, Rafael, et al., "Long Short-Term Memory Neural Networks for Flow Regime Identification using ECT", 9th World Congress on Industrial Process Tomography, Bath, UK, Sep. 2-6, 2018 (8 pages).

* cited by examiner

METHOD AND SYSTEM FOR MULTIPHASE FLOW METER USING UPDATED FLOW MODEL BASED ON SIMULATED DATA

BACKGROUND

Various production wells may produce a production stream that includes oil, water, and gas in varying distributions. In order to monitor production as well as changes to the underlying reservoir, multiphase flow meters are installed in production wells to determine liquid and gas fractions within the production stream. However, because multiphase flow meters are built using laboratory data, a multiphase flow meter may not accurately determine flow regime information or phase distribution information when installed in the field.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor and from various sensors, acquired sensor data regarding one or more multiphase flows in a multiphase flow meter that are sampled at a predetermined sampling frequency. The acquired sensor data describes various transient signals that correspond to various gas droplets. The method further includes generating, by the computer processor and based on the acquired sensor data, a flow model for the multiphase flow meter. The method further includes updating, by the computer processor, the flow model to produce a first updated flow model using simulated flow data. The method further includes updating, by the computer processor, the first updated flow model to produce a second updated flow model using simulated sensor data. The second updated flow model is used in the multiphase flow meter to determine one or more flow rates within a multiphase flow.

In general, in one aspect, embodiments relate to an apparatus that includes a flow tube that receives a multiphase flow, various sensors coupled to the flow tube, and a flow controller coupled to the plurality of sensors and the flow tube. The flow controller includes a processor, driver circuitry for operating the sensors, and a flow model. The flow model is based on acquired sensor data, simulated flow data, and simulated sensor data. The flow controller uses the flow model to determine one or more fractions of the multiphase flow.

In general, in one aspect, embodiments relate to a system that includes a wellhead coupled to a wellbore, where the wellhead obtains a production stream from a subterranean formation. The system further includes a multiphase flow meter coupled to the wellhead. The multiphase flow meter includes a flow tube, various sensors coupled to the flow tube, and a flow controller coupled to the plurality of sensors and the flow tube, where the flow controller includes a flow model. The system further includes a well control system coupled to the multiphase flow meter. The flow model is based on acquired sensor data, simulated flow data, and simulated sensor data. The flow controller uses the flow model to determine a first fraction of oil in the production stream, a second fraction of water in the production stream, and a third fraction of water in the production stream.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
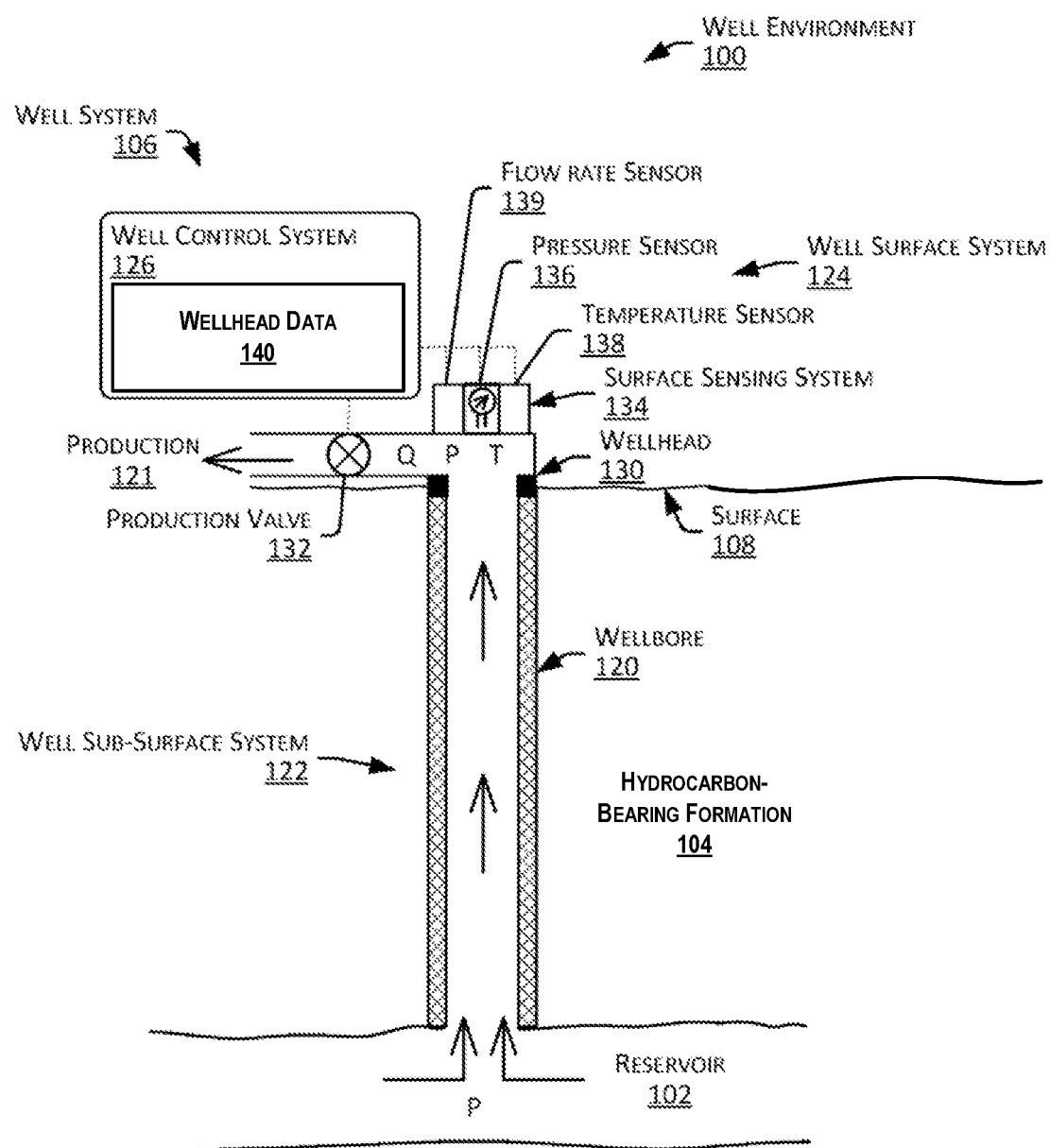
FIGS. 1 and 2 show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for generating a flow model using acquired sensor data along with simulated flow data and simulated sensor data. In some embodiments, for example, an initial flow model may be determined using a physics-based analysis of various multiphase flows detected by sensors (e.g., gamma ray sensors, capacitance sensing electrodes, etc.). In particular, high frequency fractional and differential pressure measurements may be obtained through an acquisition of high frequency sensor data. This high frequency sensor data may thus provide a time-series profile of data specific to various multiphase flow regimes in a measurement volume that may be unobtainable from averaged sensor data.

Based on an analysis of high frequency time-series data, a simulator or other computer device may determine an approximate flow model that accounts for a particular phase distribution. For example, a bubble regime may correspond to dispersed gas bubbles and large gas entities in an intermittent flow. A difficult part of flow data interpretation may relate to the presence of the gas phase within a flow. Where many models are designed to work with homogeneous flows, a three-phase gas-liquid-oil flow may be present unique challenges and flow scenarios for accurate detection. For example, the size of a typical gas bubble may be significantly larger that the size of a water/oil droplet in a multiphase mixture. Thus, application of high frequency sensor data may provide improved sensing detection for generating an initial flow model in contrast to models based on averaged sensor data.

After obtaining an initial flow model, some embodiments use various machine-learning techniques to update the flow model. In particular, artificial neural networks have been used to predict different types of data. Thus, a simulator may use one or more artificial neural networks to determine simulated flow data and/or simulated sensor data for updating a flow model. By accessing larger quantities of data for different flow scenarios among multiphase flows, a flow model may be updated to more accurately detect flow regime information and phase distributions in the field. Where simple laboratory measurements may be limited to flow conditions in laboratory settings, simulated data may allow a flow model to better capture actual field conditions. Thus, simulated data may be used in conjunction with acquired sensor data to improve performance of a particular flow model for use in a multiphase flow meter.

Turning to FIG. 1, FIG. 1 shows a schematic diagram in accordance with one or more embodiments. As shown in FIG. 1, FIG. 1 illustrates a well environment (100) that includes a hydrocarbon reservoir ("reservoir") (102) located in a subsurface hydrocarbon-bearing formation (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, and resistivity. In the case of the well system (106) being operated as a production well, the well system (106) may facilitate the extraction of hydrocarbons (or "production") from the reservoir (102).

In some embodiments, the well system (106) includes a wellbore (120), a well sub-surface system (122), a well surface system (124), and a well control system (126). The well control system (126) may include hardware and/or software that controls various operations of the well system (106), such as well production operations, well completion operations, well maintenance operations, and reservoir monitoring, assessment and development operations. In particular, a control system may be coupled to well equipment and sensors to collect data throughout a well system. In some embodiments, the well control system (126) is a programmable logic controller that may be a ruggedized computer system with functionality to withstand vibrations, extreme temperatures, wet conditions, and/or dusty conditions, such as those around a refinery or drilling rig. Likewise, the well control system (126) may also be a distributed control system (DCS). In some embodiments, the well control system (126) includes a computer system that is the same as or similar to that of computer system (802) described below in FIG. 8 and the accompanying description.

The wellbore (120) may include a bored hole that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the well control system (126) collects and records wellhead data (140) for the well system (106). The wellhead data (140) may include, for example, a record of measurements of wellhead pressure (P) (e.g., including flowing wellhead pressure (FWHP)), wellhead temperature (T) (e.g., including flowing wellhead temperature), wellhead production rate (Q) over some or all of the life of the well (106), and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well (106) to assess a relatively current state of the well system (106), and make real-time decisions regarding development of the well system (106) and the reservoir (102), such as on-demand adjustments in regulation of production stream from the well.

With respect to water cut data, the well system (106) may include one or more water cut sensors. For example, a water cut sensor may be hardware and/or software with functionality for determining the water content in oil, also referred to as "water cut." Measurements from a water cut sensor may be referred to as water cut data and may describe the ratio of water produced from the wellbore (120) compared to the total volume of liquids produced from the wellbore (120). Water cut sensors may implement various water cut measuring techniques, such as those based on capacitance measurements, Coriolis effect, infrared (IR) spectroscopy, gamma ray spectroscopy, and microwave technology. Water cut data may be obtained during production operations to determine various fluid rates found in production from the well system (106). This water cut data may be used to determine water-to-gas information regarding the wellhead (130).

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (134). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (121) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (121) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" (T). In some embodiments, the surface sensing system (134) includes a flow rate sensor (139) operable to sense one or more individual flow rates of a fluid (e.g., oil or gas in the production (121)) flowing through the well surface system (124), after it exits the wellbore (120).

In some embodiments, the flow rate sensor (139) is a multiphase flow meter. For example, a multiphase flow meter may include hardware and/or software for determining individual flow rates of different components within a three-phase flow. More specifically, a multiphase flow meter may determine a mass flow rate of a gas component and a mass flow rate of a liquid component (e.g., a component of the three-phase flow that includes oil and water) of the three-phase flow. As such, a multiphase flow meter may be used to determine an amount of oil or a portion of oil within a multiphase flow that travels through a wellhead during a given period of time. A multiphase flow meter may also include hardware that uses various types of sensors based on different sensing technologies (e.g., nuclear magnetic resonance, electromagnetic sensors, acoustic sensors, etc.) and interpretation models. For example, a multiphase flow meter may use a sensor response of magnetic resonance information to determine the number of hydrogen atoms in a particular fluid flow. Since oil, gas, and water each contain hydrogen atoms, properties of a multiphase flow may be measured using magnetic resonance. The hydrogen atoms in a magnetized fluid may respond to radio frequency pulses and emit echoes that are subsequently recorded and analyzed by the multiphase flow meter. Thus, multiphase flow rate measurements may be used for production monitoring, well control, and/or reservoir optimization.

Figure 2:
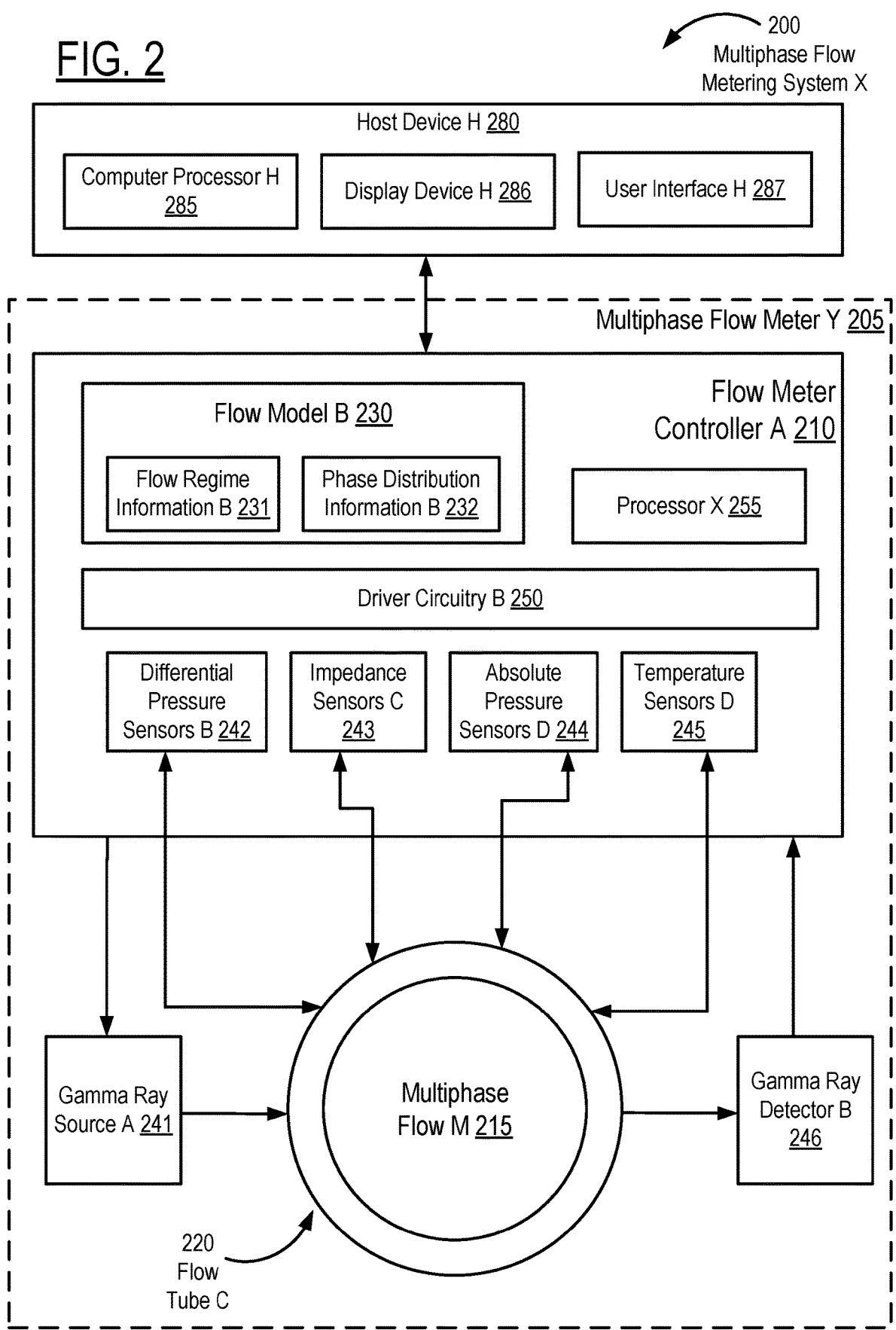

Turning to FIG. 2, FIG. 2 shows a schematic diagram in accordance with one or more embodiments. As shown in FIG. 2, a multiphase flow metering system (e.g., multiphase flow metering system X (200)) may include a multiphase flow meter (e.g., multiphase flow meter Y (205)) and a host device (e.g., host device H (280)). In response to determining flow rate data regarding a multiphase flow, a multiphase flow meter may transmit flow rate data to a host device, such as a well control system or another type of computer system, over a network. The multiphase flow meter may be coupled to one or more flow tubes (e.g., flow tube C (220)) in order to determine the flow rate data, such as individual flow rates and/or oil, gas, and/or water fractions of a corresponding multiphase flow (e.g., multiphase flow M (215)). A flow tube may be a fluid conduit, such as pipe, that may provide a fluid sampling for analysis by the multiphase flow meter. Examples of flow tubes may include a bent flow tube, a straight flow tube, or another type of flow tube. Furthermore, a flow model may be stored within a multiphase flow meter as a portion of a database and/or as one or more flow regime maps that are associated with various sensor values. By analyzing sensor data in connection with one or more flow models, a flow meter may determine flow rate data that corresponds to acquired sensor data. Flow rate data may include corresponding fractional data (e.g., gas fraction of a multiphase flow) and/or velocity data (e.g., an individual flow rate of oil or water in the multiphase flow).

Furthermore, the multiphase flow meter may include a flow meter controller (e.g., flow meter controller A (210)) that controls sensing operations and/or the flow analysis operations. In some embodiments, a flow controller uses one or more flow models (e.g., flow model B (230)) to determine flow rate data (e.g., flow regime information B (231), phase distribution information B (232)) regarding a particular flow. Phase distribution information may describe the respective fractions of one or more phases (e.g., gas phase, oil phase, water phase), in a particular flow. Flow regime information may refer to a specific manner that two or three phases flow through a flow tube. For example, a flow regime may be expressed using various superficial velocities. One example of a flow regime may be a "bubble regime," in which gas is entrained as bubbles within a liquid. Another example of a flow regime is a "slug regime" that may correspond to a series of liquid "slugs" or "plugs" separated by relatively large gas pockets. Accordingly, flow model may describes changes in a multiphase flow between transitions from high-liquid compositions to high-gas compositions and vice versa. Other flow regimes may include an annular flow regime, a dispersed flow regime, and a froth flow regime.

Keeping with flow controllers, a flow meter controller may include one or more drivers (e.g., driver circuitry B (255)) and one or more processors. A driver may include software and/or hardware, such as driver circuitry, for operating one or more sensors. In particular, a driver may include digital-to-analog converters and analog-to-digital converters, for example. With driver circuitry, a sensing signal may be transmitted to one or more sensing electrodes to obtain a resulting signal, e.g., that is detected at one or more receivers. Examples of processor may include a digital signal processor (DSP), a field-programmable gate array (FPGA), an integrated circuit, such as an application-specific integrated circuit (ASIC), a computer processor, such as computer processor (802) described below in FIG. 8, etc.

With respect to host devices, a host device may include a computer processor (e.g., computer processor H (285), a display device (e.g., display device H (286)), and/or a user interface (e.g., user interface H (287)) for communicating with a flow controller. A display device may output flow rate data regarding a particular fluid sample to a user, while a user interface may be used to modify one or more settings in a multiphase flow meter. More specifically, a host device may be a well control system (e.g., well control system (126)), or a computer system, such as computer system (802) described below in FIG. 8 and the accompanying description.

Furthermore, a multiphase flow meter may include various types of sensors (e.g., differential pressure sensors B (242), impedance sensors C (243), absolute pressure sensors D (244), temperature sensors D (245)) to determine various fluid properties, such as a volume fraction of liquid in the flow tube (i.e., to implement a liquid fraction sensor), and/or a void fraction value that corresponds to a percentage of a material in the flow tube that is in gaseous form (i.e. to implement a void fraction sensor). As such, various flow composition techniques may be used, such as based on gamma ray sensing or x-ray sensing. In gamma ray sensing, a liquid flow rate may be determined from a liquid film thickness and a pressure gradient (dp/dz) (e.g., using differential pressure sensors B (242)) along a straight tube section of a flow tube. The liquid film thickness may be determined using gamma ray densitometry, conductance sensor measurements, capacitance sensor measurements, acoustic sensor measurements, and/or fluorescent sensor measurements to determine the liquid film thickness, depending on the multiphase flow metering system. With respect to gamma ray sensing, a gamma ray sensor may include a gamma ray source (e.g., gamma ray source A (241) that produces high energy photons) and a gamma ray detector (e.g., gamma ray detector B (246)) for determining a fluid composition of a specific flow. The attenuation of photons along a narrow beam path between the gamma ray source and the gamma ray detector may be dependent on the energy of the photons, which may describe the atomic composition of the flow and other fluid properties, such as density. Thus, a multiphase flow meter may use one or more of the following sensors: motion sensors for measuring the fluid velocity within a flow tube, density sensors for acquiring density measurements of a material flowing through the flow tube, temperature sensors for measuring the temperature in the flow tube, and/or pressure sensors for sensing one or more pressures of a material flowing through the flow tube. In some embodiments, a multiphase flow meter may use pressure-volume-temperature (PVT) modeling in place of or in addition to gamma ray sensing to determine one or more fluid properties.

In some embodiments, for example, a multiphase flow meter includes a Venturi meter. For example, a Venturi meter is disposed downstream of an expansion contraction section. Using a Venturi meter, a differential pressure sensor may determine a pressure drop between an inlet and a throat of the Venturi, while two absolute pressure sensors may be used to measure inlet pressure and outlet pressure. Likewise, temperatures sensors may also acquire temperature sensor data regarding inlet temperature values and outlet temperature values. Thus, sensor data from various sensors in a Venturi meter may be used to determine inlet fluid properties and outlet fluid properties.

In some embodiments, a simulator generates simulated flow data and/or simulated sensor data using one or more machine-learning techniques to update one or more flow models. More specifically, a simulator may include hardware and/or software with functionality for using one or more machine-learning models to generate simulated data. Examples of machine-learning models include convolutional neural networks, deep neural networks, recurrent neural networks, support vector machines, decision trees, inductive learning models, deductive learning models, supervised learning models, unsupervised learning models, reinforcement learning models, etc. In some embodiments, two or more different types of machine-learning models are integrated into a single machine-learning architecture, e.g., a machine-learning model may include decision trees and neural networks. In some embodiments, the simulator may generate augmented or synthetic data to produce a large amount of interpreted data for training a particular model.

With respect to artificial neural networks, for example, an artificial neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, an artificial neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

In some embodiments, simulated flow data and/or simulated sensor data are generated using one or more temporal convolution networks (TCNs). In particular, a TCN may be an artificial neural network architecture that includes functionality for obtaining a sequence of any length (such as a time-series of sensor data) and mapping the input sequence to an output sequence of the same length. Thus, a TCN may operate in a similar manner as a recurrent neural network (RNN). As such, a TCN may have the ability look far into the past of an input time-series to make a particular prediction using a combination of deep neural networks (e.g., an augmented network with residual layers) and dilated convolutions. In some embodiments, a TCN uses a one-dimensional fully-convolutional network (FCN) architecture, where each hidden layer is the same length as the input layer. Thus, unlike in RNNs where predictions for later timesteps may need to wait for predictions for earlier timesteps, convolutions may be done in parallel within a TCN. Therefore, in both training and evaluation, a long input sequence may be processed as a whole in a TCN instead of sequentially as in RNN.

While FIGS. 1 and 2 show various configurations of components, other configurations may be used without departing from the scope of the disclosure. For example, various components in FIGS. 1 and 2 may be combined to create a single component. As another example, the functionality performed by a single component may be performed by two or more components.

Figure 3:
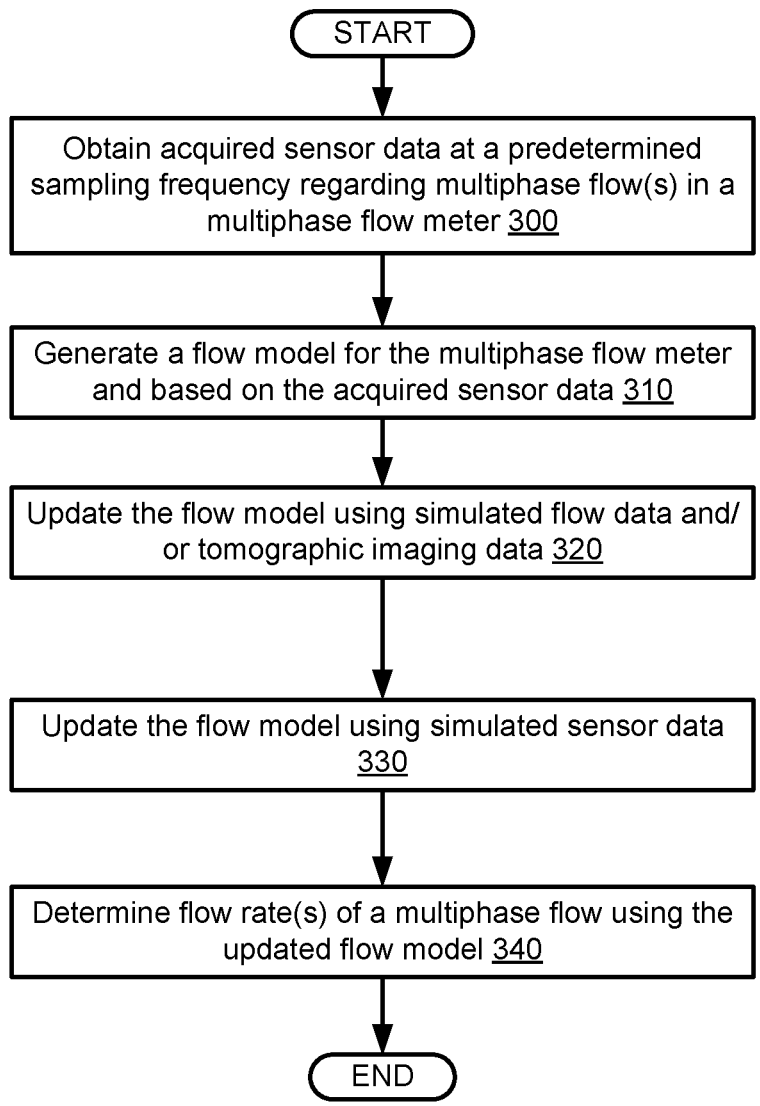
FIG. 3 shows a flowchart in accordance with one or more embodiments.

Turning to FIG. 3, FIG. 3 shows a flowchart in accordance with one or more embodiments. Specifically, FIG. 3 describes a general method for generating and/or using a flow model. One or more blocks in FIG. 3 may be performed by one or more components (e.g., multiphase flow metering system X (200)) as described in FIGS. 1 and 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, acquired sensor data is obtained at a predetermined sampling frequency regarding one or more multiphase flows in a multiphase flow meter in accordance with one or more embodiments. For example, a multiphase flow meter may be installed for acquiring sensor data, such as absolute pressure sensor data, temperature sensor data, differential pressure sensor data, and/or impedance measurements (e.g., capacitance or conductivity measurements from various sensing electrodes) regarding one or more multiphase flows. This acquired sensor data may be used to determine flow regime information as well as phase distribution information. Acquired sensor data may be collected from the sensors over a certain time period from laboratory flow loop experiments at one or more sampling frequencies.

Likewise, the multiphase flow meter may include various sensors to determine gas-oil ratio (GOR) data regarding a particular fluid flow. For example, a gamma ray sensor may be used to determine GOR data may be performed on a fluid sample. On the other hand, complex PVT modelling may be used to determine GOR data without gamma ray sensing. In some embodiments, the multiphase flow meter is a Venturi meter that acquires differential pressure data over a predetermined throat in the Venturi meter.

In some embodiments, sensor data is acquired at a high sampling frequency to capture various transient signals that describe a "more liquid" flow regime and/or a "more gas" flow regime within a particular flow. Rather than using averaged sensor data of multiple sensor measurements, continuous transient time-series data may be acquired from such sensors. This high frequency time-series data may provide a better indicator of one or more flow regimes, accordingly. In some embodiments, for example, the predetermined sampling frequency may be determined using the following equation:

$$f \gg \frac{u}{L} \qquad \text{Equation 1}$$

where f is the predetermined sampling frequency, u is a particular flow velocity, and L is the size of sensing electrodes for admittance measurements or capacitance measurements. In some embodiments, for example, the predetermined sampling frequency is 100 Hz to 1000 Hz for capacitance sensors. Thus, sensor data may be acquired using a sampling frequency that corresponds to a frequency value greater than a ratio of a predetermined flow velocity to a size of a sensing electrode for an electromagnetic measurement of the one or more multiphase flows.

Figure 4:
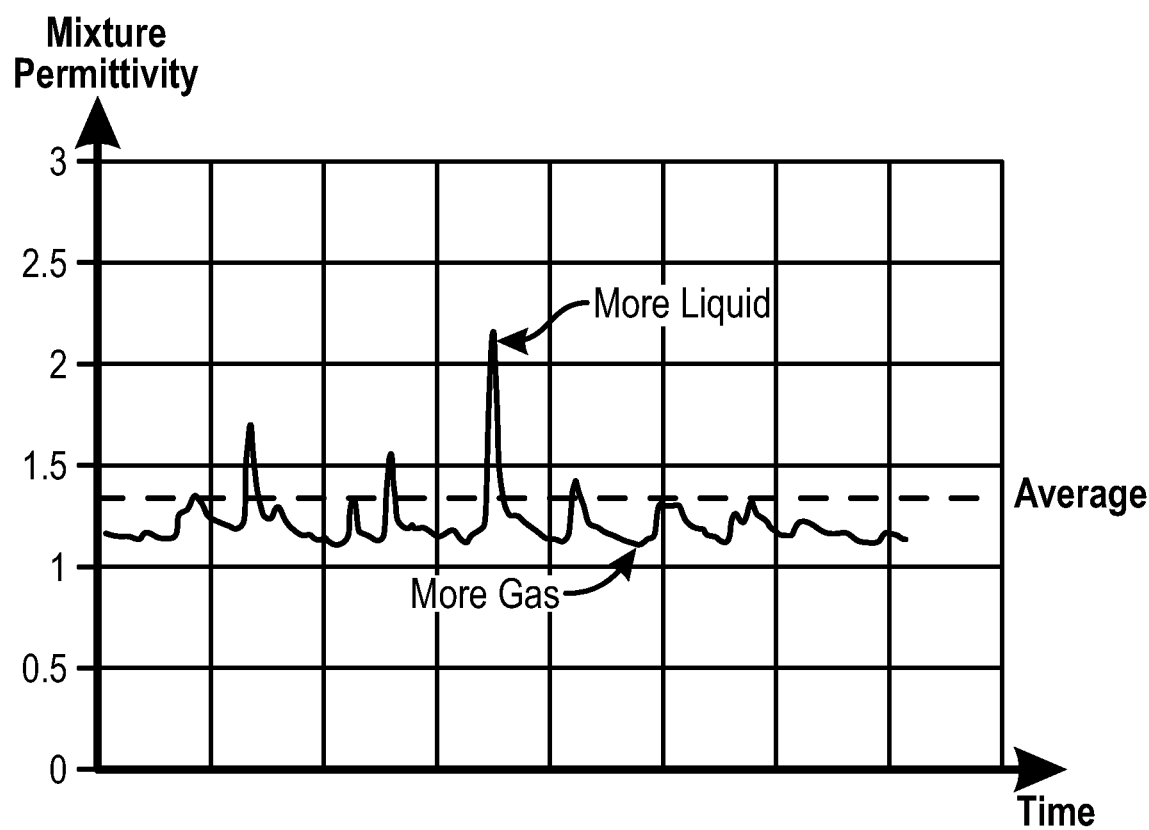
FIGS. 4, 5, 6, 7A, and 7B show examples in accordance with one or more embodiments.

Turning to FIG. 4, FIG. 4 illustrates an example of a mixture's permittivity of a continuous production stream that is sampled at a high sampling frequency. As shown in FIG. 4, various transient signals in acquired sensor data illustrate different sensor peaks and sensor dips that are undetected in the averaged sensor data. Thus, a flow regime with "more liquid" is detected at one sensor peak, and another flow regime with "more gas" is detected at one sensor dip among the transient signals. Thus, FIG. 4 may illustrate how high frequency sensor data may provide flow regime information or phase distribution information for determining a more accurate flow model.

Returning to FIG. 3, in Block 310, a flow model is generated for a multiphase flow meter and based on acquired sensor data in accordance with one or more embodiments. Based on acquired sensor data, one or more time-series analyses may be applied to determine a particular flow model. For example, fractional measurements (e.g., corresponding to impedance values of the multiphase flows) and velocity measurements (e.g., corresponding to measurements of differential pressure) may be determined using the high frequency sensor data. For an intermittent flow, impedance sensor data may indicate various time instants, where mostly liquid or mostly gas is present in a sample volume (see, e.g., FIG. 4). Likewise, the degree of heterogeneity of a sensor signal may be a direct function of a gas's impact (e.g., a completely homogenous sample may identify a fully dispersed multiphase flow). Thus, by matching an impedance time series with differential pressure data, details on individual liquid and gas velocities may be obtained for the flow model. As such, instantaneous measurements may be used with supplementary information (e.g., absolute pressure data, temperature data, gas-oil ratio data, etc.) to generate and/or update a particular flow model. Thus, the flow model may describe flow regime information as well as various phase distributions in different multiphase flows.

In some embodiments, the flow model is an approximate model of multiphase flow regime in a measurement volume. For example, the approximate model may be determined using sensor time-series data and operational data from laboratory flow loop experiments. In some embodiments, the approximate flow model may represent a multiphase flow using a predetermined number of intermittent sections that include the following components: large gas bubbles or a dispersed gas-liquid phase that includes oil, water and gas dispersed as small bubbles in liquid. Likewise, the flow model may include a liquid fractional model as well as a void fractional model.

In Block 320, a flow model is updated using simulated flow data and/or tomographic imaging data in accordance with one or more embodiments. For example, various simulations of different multiphase flows may be used to generate simulated sensor data. This simulated flow data may cover various flow scenarios that occur in the field, and which are not represented by the acquired sensor data in Block 300. Where acquired sensor data may be produced under ideal conditions that perfectly match a multiphase flow, simulated flow data may account for various sources of uncertainty in actual flow conditions at a well. Thus, updating the flow model using simulated flow data may provide a correction to the flow model for these uncertain conditions. In some embodiments, simulated flow data is obtained using various computer simulations of multiphase flows, where the reference flow rates from acquired sensor data operate as boundary conditions for the computer simulations. By using simulated flow data, a computer system may determine whether corresponding flow regime information and phase distribution information is correct. For example, the computer system may determine an estimated size and distribution of gas inclusions from a flow model based on simulated data.

Moreover, in some embodiments, one or more artificial neural networks are used to determine simulated flow data for updating a flow model. By incorporating artificial neural networks, for example, differences between model predictions and simulations of a multiphase flow may be minimized accordingly.

Figure 5:
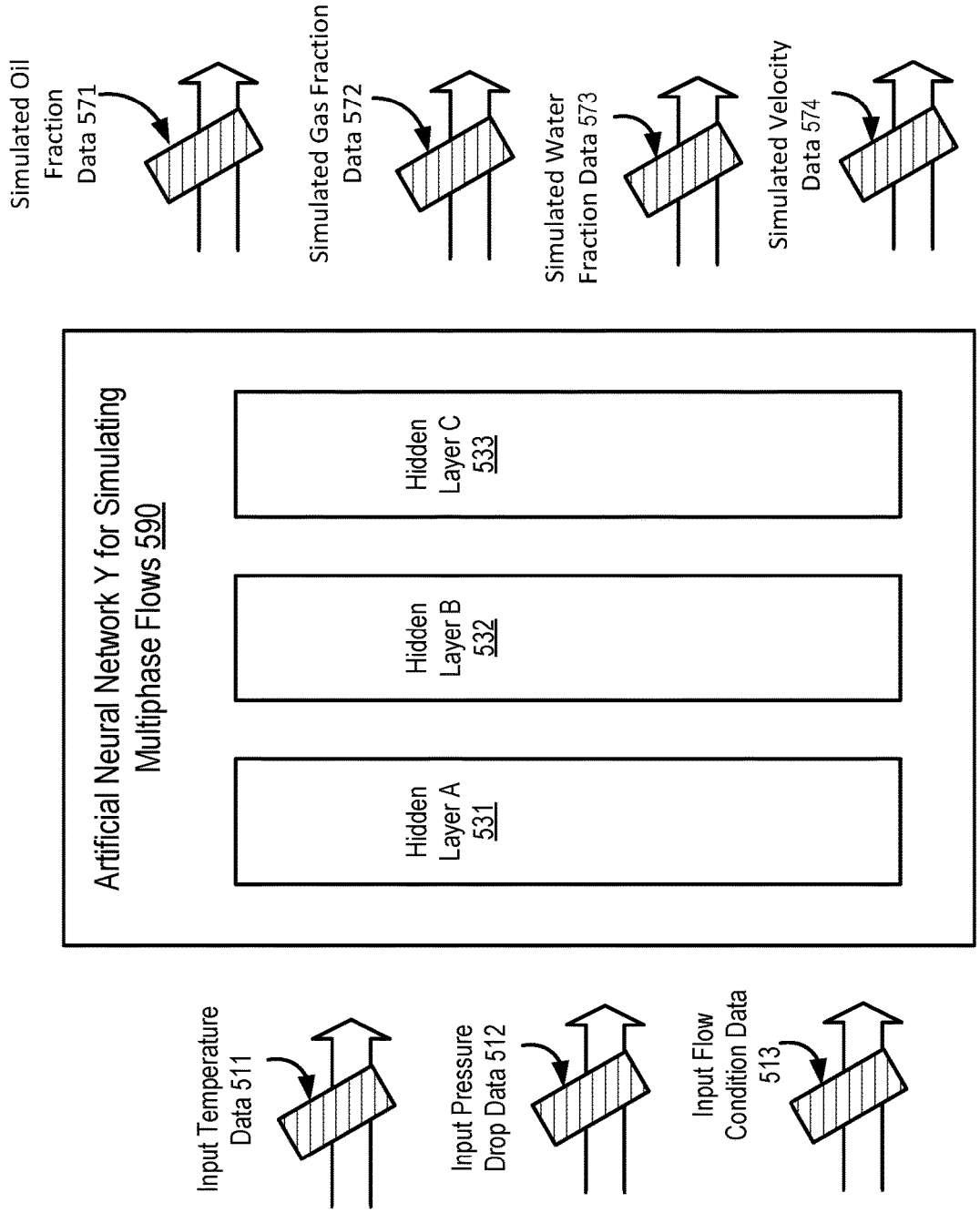

Turning to FIG. 5, FIG. 5 provides an example of using an artificial neural network to generate simulated flow data in accordance with one or more embodiments. The following example is for explanatory purposes only and not intended to limit the scope of the disclosed technology. In FIG. 5, an artificial neural network Y (590) includes various hidden layers, i.e., hidden layer A (531), hidden layer B (532), and hidden layer C (533), and is used for simulating multiphase flows. The artificial neural network Y (590) may be located on a computer system, such as a simulator, that runs one or more multiphase flow simulations for a particular multiphase flow meter. In particular, the artificial neural network Y (590) obtains various input data, i.e., input temperature data (511), input pressure drop data (512), input flow condition data (513). For example, the input temperature data (511) and input pressure drop data (512) may correspond to predicted data in one or more flow scenarios that would be acquired by actual temperature sensors and/or actual pressure sensors, respectively, in a multiphase flow meter.

Keeping with FIG. 5, the input flow condition data (513) may correspond to a particular flow regime that is being simulated, such as a particular type of bubble regime, as well as other flow conditions such as mechanical noise and various impurities within a production stream. Using the input data (511, 512, 513), the artificial neural network Y (590) generates corresponding simulated flow data, i.e., simulated oil fraction data (571), simulated gas fraction data (572), simulated water fraction data (573), and simulated velocity data (574). For example, simulated velocity data may describe individual velocity values of oil, water, and/or gas within a multiphase flow. The simulated flow data (571, 572, 573, 574), may be used by the computer system to update a corresponding flow model, accordingly.

Returning to FIG. 3, in some embodiments, tomographic imaging data is used to verify or validate the simulated flow data for use in updating the flow model. For example, tomographic imaging may be acquired using one or more laboratory imaging tools regarding one or more multiphase flows in a multiphase flow meter (e.g., a multiphase flow in a flow tube), and thereby quantify various sources of uncertainty in the initial flow model. By validating the simulated flow data (e.g., by using a predetermined criterion, such as a predetermined degree of error between the simulated flow data and the tomographic imaging data), a simulator may confirm whether the simulated flow data should be included in a model update. Where the tomographic imaging data substantially matches simulated flow data, the flow model may be updated using the matched simulated flow data.

In Block 330, a flow model is updated using simulated sensor data in accordance with one or more embodiments. For example, a sensor response acquired for a particular multiphase flow in laboratory conditions may differ from the sensor response for the same multiphase flow in field conditions. Thus, simulated sensor data may be used to adjust a flow model for actual sensor conditions for determining multiphase flow rate data. By comparing simulated sensor data to the acquired sensor values from Block 300 (e.g., the initial sensor time-series), the simulated sensor data may be validated for inclusion in updating the flow model. For example, discrepancies between acquired data and simulated data may indicate the need to further update the flow model. Thus, simulated sensor data may provide increased certainty regarding actual precision of the final flow model for field conditions. In some embodiments, an electromagnetic sensor response is predicted using computer simulations. Similar to the simulated flow rate data, synthetic impedance data may be generated for updating a particular flow model.

Moreover, in some embodiments, one or more artificial neural networks are used to determine simulated sensor data for updating a flow model. By incorporating artificial neural networks, for example, differences between model predictions and simulations of a multiphase flow meter may be minimized accordingly.

Figure 6:
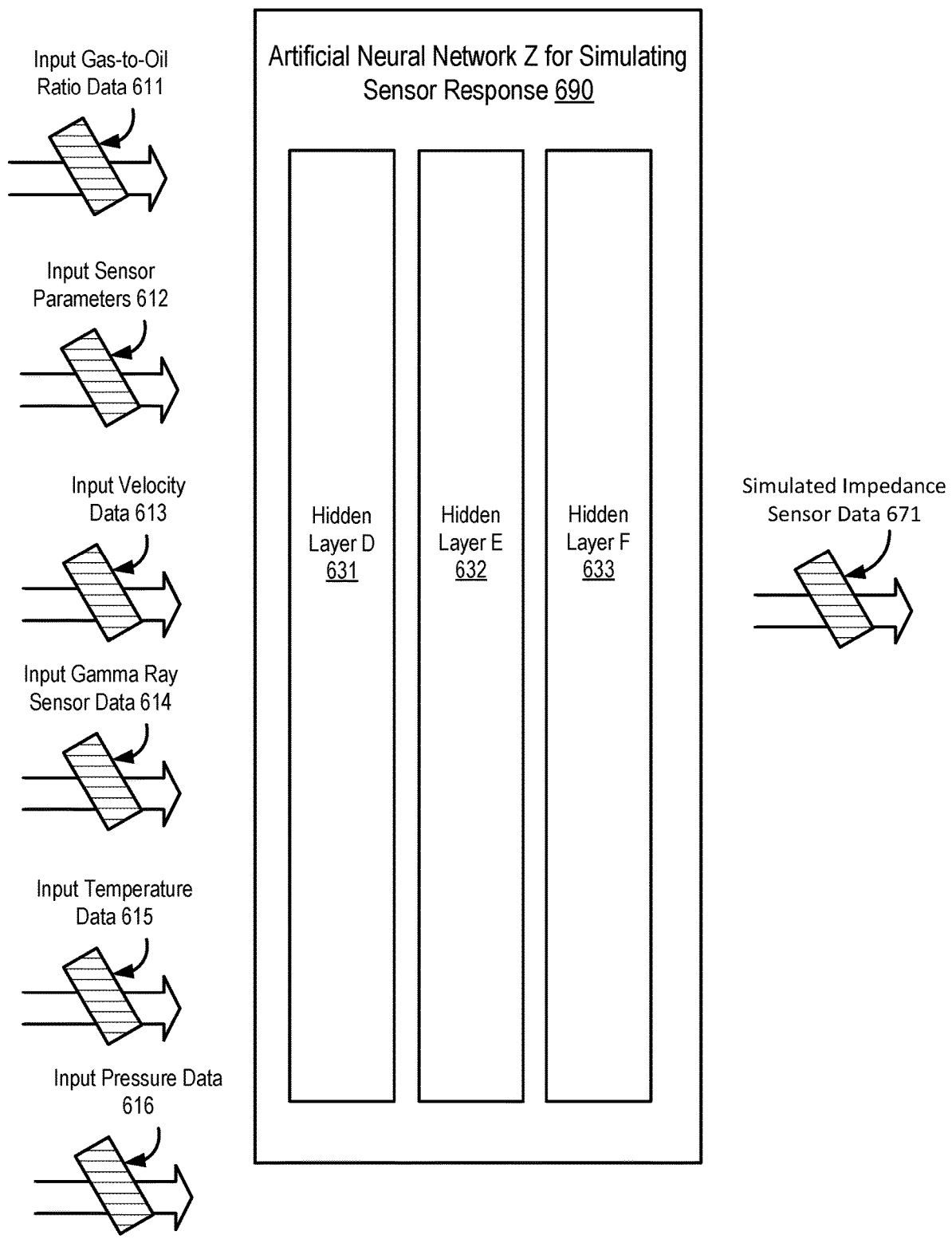

Turning to FIG. 6, FIG. 6 provides an example of using an artificial neural network to generate simulated sensor data in accordance with one or more embodiments. The following example is for explanatory purposes only and not intended to limit the scope of the disclosed technology. In FIG. 6, an artificial neural network Z (690) includes various hidden layers, i.e., hidden layer D (631), hidden layer E (632), and hidden layer F (633), and is used for simulating sensor responses in a multiphase flow meter in response to various multiphase flows. The artificial neural network Z (690) may be located on a computer system, such as a simulator, that runs one or more sensor simulations for a particular multiphase flow meter. In particular, the artificial neural network Z (690) obtains various input data, i.e., input gas-to-oil ratio data (611), input sensor parameters (612) (e.g., for conductance, capacitance, or admittance sensors, the input sensor parameters may correspond to sensor electrode dimensions), input velocity data (613), input gamma ray sensor data (614), input temperature data (615), and input pressure data (616) regarding the multiphase flow within a flow tube.

Keeping with FIG. 6, a simulator may use property data regarding a flow tube or a multiphase flow meter along with other input sensor data to determine simulated sensor data. Using the input data (611, 612, 613, 614, 615, 616), the artificial neural network Z (690) generates corresponding simulated sensor data, i.e., simulated impedance sensor data (671). For example, simulated impedance sensor data (671) may correspond to a predicted electromagnetic sensor response of one or more impedance sensors coupled to a flow tube. The simulated impedance sensor data (671), may be used by the computer system to update a corresponding flow model, accordingly. While simulated impedance sensor data is shown in FIG. 6, other embodiments are contemplated that generated simulated acoustic sensor data, simulated gamma ray sensor data, and other sensor data types.

Returning to FIG. 3, in Block 340, one or more flow rates are determined regarding a multiphase flow using an updated flow model in accordance with one or more embodiments. For example, once a flow model is verified as operating reasonably at laboratory conditions, a flow model may implemented in an oil field. For example, an updated flow model may be installed in a multiphase flow meter, which may be installed at a wellhead in a production wellsite. Likewise, if a multiphase flow meter is already located in an oil field, a new flow model may be transmitted remotely to the multiphase flow meter, such as using a software update, to replace the previous flow model.

Figure 7A:
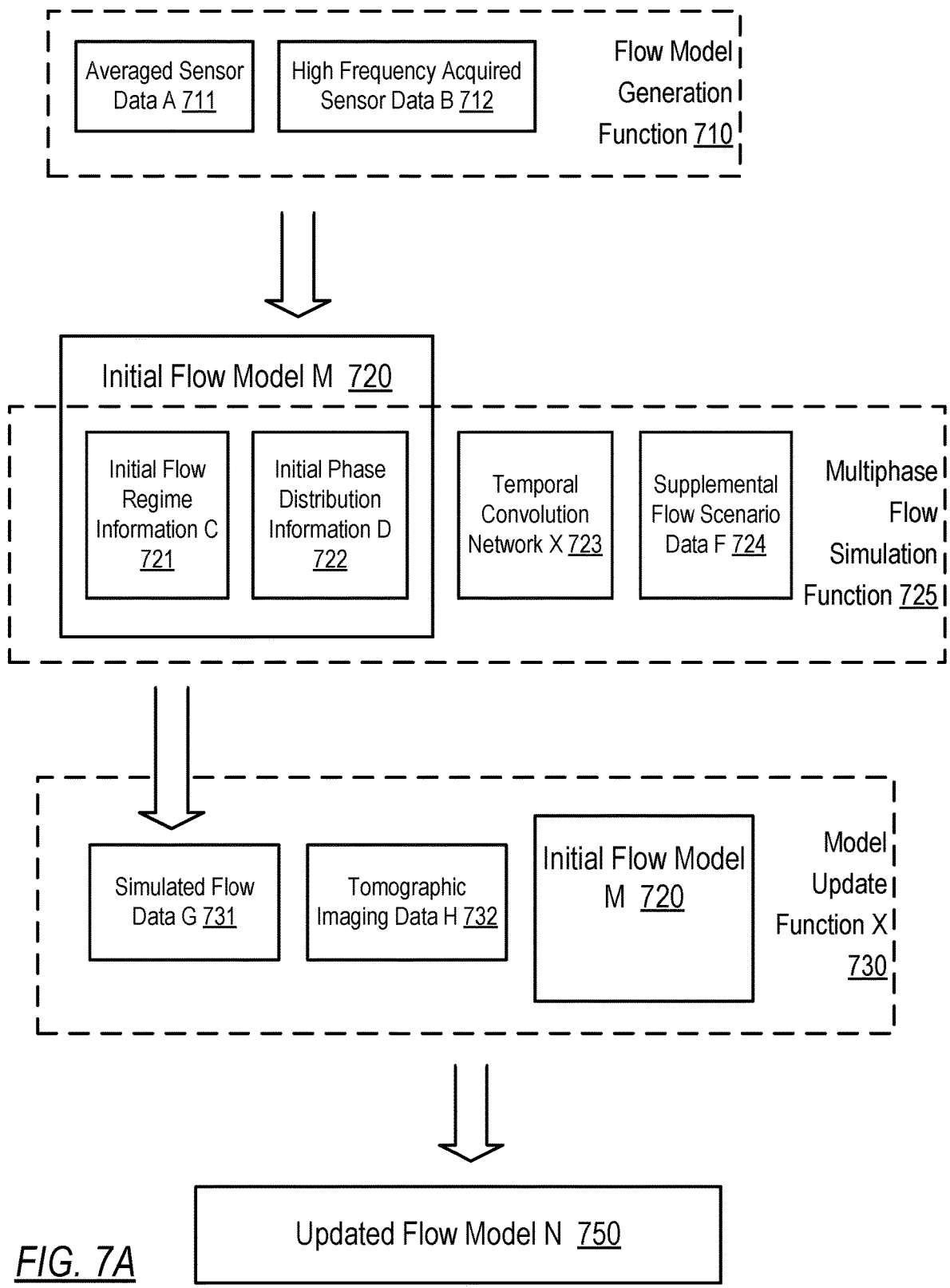
Figure 7B:
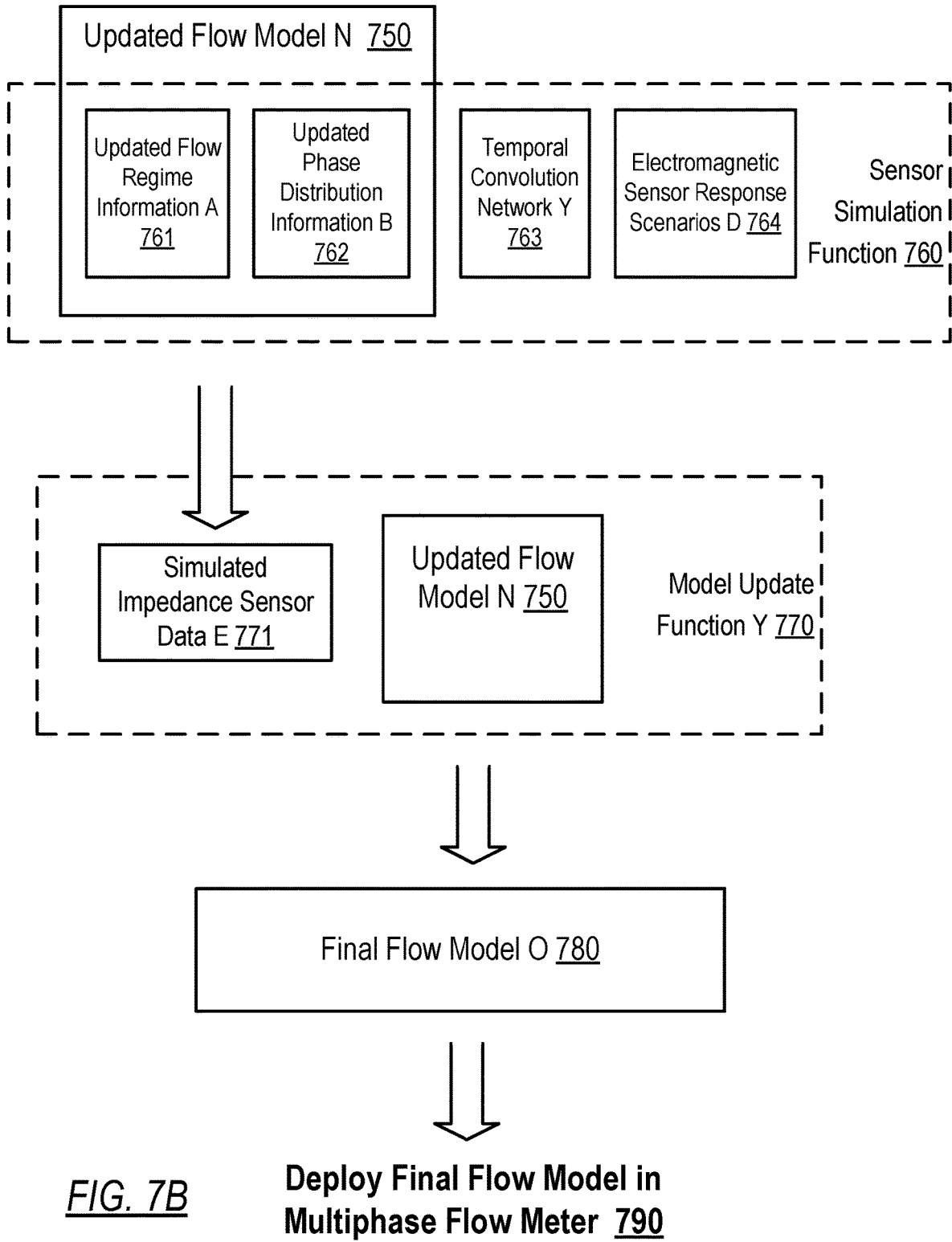

Turning to FIGS. 7A and 7B, FIGS. 7A and 7B provide an example of updating a flow model using simulated flow data and simulated impedance sensor data in accordance with one or more embodiments. The following example is for explanatory purposes only and not intended to limit the scope of the disclosed technology. In FIG. 7A, a simulator (not shown) obtains averaged sensor data A (711) and high frequency acquired sensor data B (712) to generate an initial flow model M (720) using a flow model generation function (710). The initial flow model M (720) includes initial flow regime information C (721) and initial phase distribution information D (722). Next, the simulator uses the initial flow model M (720), a temporal convolution network X (723), and supplemental flow scenario data F (724) (e.g., input temperature data, input differential and absolute pressure data, input flow conditions, etc.) to generate simulated flow data G (731) with a multiphase flow simulation function (725). Then, the simulator uses the simulated flow data G (731), tomographic imaging data H (732), and the initial flow model M (720) as inputs to a model update function X (730) that produces an updated flow model N (750). The updated flow model N (750) includes updated flow regime information A (761) and updated phase distribution information B (762).

Turning to FIG. 7B, a simulator uses the updated flow model N (750), a temporal convolution network Y (763), and electromagnetic sensor response scenarios D (764) as inputs to a sensor simulation function (760). Using the sensor simulation function (760), the simulator produces simulated impedance sensor data D (771). The simulated impedance sensor data D (771) is used with a model update function Y (770) to further update the updated flow model N (750) to produce a final flow model O (780). Subsequently, the final flow model O (780) may be deployed in a multiphase flow meter in a deployment (790).

Figure 8:
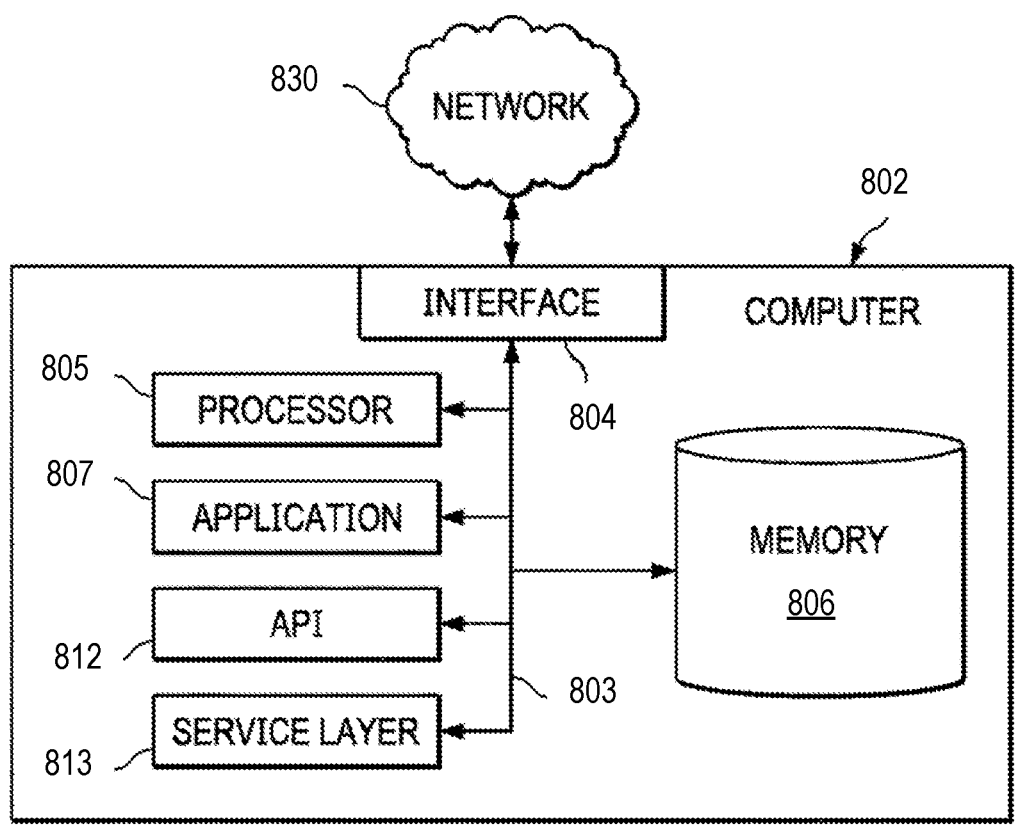
FIG. 8 shows a computer system in accordance with one or more embodiments.

Embodiments may be implemented on a computer system. FIG. 8 is a block diagram of a computer system (802) used to provide computational functionalities associated with described algorithms, methods, functions, processes, flows, and procedures as described in the instant disclosure, according to an implementation. The illustrated computer (802) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a GUI.

The computer (802) can serve in a role as a client, network component, a server, a database or other persistency, or any other component (or a combination of roles) of a computer system for performing the subject matter described in the instant disclosure. The illustrated computer (802) is communicably coupled with a network (830). In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application (for example, executing on another computer (802)) and responding to the received requests by processing the said requests in an appropriate software application. In addition, requests may also be sent to the computer (802) from internal users (for example, from a command console or by other appropriate access method), external or third-parties, other automated applications, as well as any other appropriate entities, individuals, systems, or computers.

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) (or a combination of the API (812) and service layer (813). The API (812) may include specifications for routines, data structures, and object classes. The API (812) may be either computer-language independent or dependent and refer to a complete interface, a single function, or even a set of APIs. The service layer (813) provides software services to the computer (802) or other components (whether or not illustrated) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or other suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (804 includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) also includes a memory (806) that holds data for the computer (802) or other components (or a combination of both) that can be connected to the network (830). For example, memory (806) can be a database storing data consistent with this disclosure. Although illustrated as a single memory (806) in FIG. 8, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

There may be any number of computers (802) associated with, or external to, a computer system containing computer (802), each computer (802) communicating over network (830). Further, the term "client," "user," and other appropriate terminology may be used interchangeably as appropriate without departing from the scope of this disclosure. Moreover, this disclosure contemplates that many users may use one computer (802), or that one user may use multiple computers (802).

In some embodiments, the computer (802) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
obtaining, by a computer processor and from a plurality of sensors, acquired sensor data regarding one or more multiphase flows in a multiphase flow meter that are sampled at a predetermined sampling frequency, wherein the acquired sensor data describes a plurality of transient signals that correspond to a plurality of gas droplets;
generating, by the computer processor and based on the acquired sensor data, a flow model for the multiphase flow meter;
updating, by the computer processor, the flow model to produce a first updated flow model using simulated flow data; and
updating, by the computer processor, the first updated flow model to produce a second updated flow model using simulated sensor data,
wherein the second updated flow model is used to determine one or more flow rates within a multiphase flow, and
wherein the predetermined sampling frequency corresponds to a frequency value greater than a ratio of a predetermined flow velocity to a size of a sensing electrode for an electromagnetic measurement of the one or more multiphase flows.

2. The method of claim 1, further comprising:
generating, using an artificial neural network and flow condition data, the simulated flow data; and
validating, using tomographic imaging data of the multiphase flow meter, the simulated flow data,
wherein the simulated flow data is used to update the flow model in response to validating the simulated flow data.

3. The method of claim 1, further comprising:
generating, using an artificial neural network, the simulated sensor data; and
validating, using the acquired sensor data, the simulated sensor data,
wherein the simulated sensor data is used to update the flow model in response to validating the simulated sensor data.

4. The method of claim 1,
wherein the simulated flow data and the simulated sensor data are generated using a temporal convolution network (TCN).

5. The method of claim 1,
wherein the simulated sensor data corresponds to an electromagnetic sensor response in the multiphase flow meter, and
wherein the plurality of sensors comprise one or more impedance sensors.

6. The method of claim 1,
wherein the simulated sensor data corresponds to an acoustic response in the multiphase flow meter, and
wherein the plurality of sensors comprise one or more acoustic sensors.

7. The method of claim 1, further comprising:
determining, using a gamma ray source and a gamma ray detector among the plurality of sensors, gas-oil ratio (GOR) data regarding the one or more multiphase flows,
wherein the GOR data is used to generate the flow model.

8. The method of claim 1,
wherein the plurality of sensors comprise at least one sensing electrode, and
wherein the predetermined sampling frequency corresponds to a range from 100 Hz to 1000 Hz.

9. The method of claim 1,
wherein the second updated flow model describes a plurality of flow regimes and a plurality of phase distributions, and
wherein the second updated flow model is used by a flow controller in the multiphase flow meter to determine a fraction of gas in the multiphase flow.

10. The method of claim 1, further comprising:
determining, using the multiphase flow meter and the second updated flow model, a fraction of oil, a fraction of gas, and a fraction of water in a production stream at a wellhead.

11. An apparatus, comprising:
a flow tube configured to receive a multiphase flow;
a plurality of sensors coupled to the flow tube;
a flow controller coupled to the plurality of sensors and the flow tube, the flow controller comprising:
  a processor,
  driver circuitry for operating the plurality of sensors, and
  a flow model, and
wherein the flow model is based on acquired sensor data, simulated flow data, and simulated sensor data,
wherein the flow controller uses the flow model to determine one or more fractions of the multiphase flow,
wherein the plurality of sensors comprise at least one sensing electrode operating at a predetermined sampling frequency, and wherein the predetermined sampling frequency corresponds to a frequency value greater than a ratio of a predetermined flow velocity to a size of the at least one sensing electrode for an electromagnetic measurement of one or more multiphase flows.

12. The apparatus of claim 11,
wherein the plurality of sensors comprise an absolute pressure sensor, a temperature sensor, a differential pressure sensor, a gamma ray source, and a gamma ray detector.

13. The apparatus of claim 11,
wherein the simulated flow data is generated using an artificial neural network and a plurality of flow scenarios,
wherein the simulated flow data is validated using tomographic imaging data of one or more multiphase flows in the flow tube, and
wherein the simulated flow data is used to update the flow model in response to validating the simulated flow data.

14. The apparatus of claim 11,
wherein the plurality of sensors comprise one or more impedance sensors, and
wherein the simulated sensor data corresponds to an electromagnetic sensor response.

15. The apparatus of claim 11,
wherein the plurality of sensors comprise one or more acoustic sensors, and
wherein the simulated sensor data corresponds to an acoustic response.

16. The apparatus of claim 11,
wherein the plurality of sensors comprise at least one sensing electrode operating at a predetermined sampling frequency, and
wherein the predetermined sampling frequency corresponds to a range from 100 Hz to 1000 Hz.

17. The apparatus of claim 11,
wherein the flow model describes a plurality of flow regimes and a plurality of phase distributions, and
wherein the plurality of flow regimes comprises a bubble regime regarding a gas phase of the multiphase flow.

18. A system, comprising:
a wellhead coupled to a wellbore, the wellhead configured to obtain a production stream from a subterranean formation;
a multiphase flow meter coupled to the wellhead, the multiphase flow meter comprising:
  a flow tube,
  a plurality of sensors coupled to the flow tube; and
  a flow controller coupled to the plurality of sensors and the flow tube, the flow controller comprising a flow model; and
a well control system coupled to the multiphase flow meter,
wherein the flow model is based on acquired sensor data, simulated flow data, and simulated sensor data,
wherein the flow controller uses the flow model to determine a first fraction of oil in the production stream, a second fraction of water in the production stream, and a third fraction of water in the production stream,
wherein the plurality of sensors comprise at least one sensing electrode operating at a predetermined sampling frequency, and
wherein the predetermined sampling frequency corresponds to a frequency value greater than a ratio of a predetermined flow velocity to a size of the at least one sensing electrode for an electromagnetic measurement of one or more multiphase flows.

* * * * *